Dec. 2, 1969 K. E. MASON ET AL 3,481,244
FLOATING FASTENER
Filed Sept. 23, 1968 2 Sheets-Sheet 1

INVENTORS.
JOSEF F. VOLKMANN
KURT E. MASON
BY
FOWLER, KNOBBE
& MARTENS
ATTORNEYS.

Dec. 2, 1969  K. E. MASON ET AL  3,481,244
FLOATING FASTENER

Filed Sept. 23, 1968  2 Sheets-Sheet 2

INVENTORS.
JOSEF F. VOLKMANN
KURT E. MASON
BY
FOWLER, KNOBBE
& MARTENS
ATTORNEYS.

United States Patent Office 3,481,244
Patented Dec. 2, 1969

3,481,244
FLOATING FASTENER
Kurt E. Mason, Fullerton, and Josef F. Volkmann, Tustin, Calif.; said Volkmann assignor to Shur-Lok Corporation, a corporation of California
Filed Sept. 23, 1968, Ser. No. 761,490
Int. Cl. F16b 13/04, 33/04, 39/00
U.S. Cl. 85—72
9 Claims

ABSTRACT OF THE DISCLOSURE

A floating fastener device for mounting in panel members to provide a socket for mating fastening members on structural parts to be attached to the panel. The fasteners includes a tubular sleeve, a retaining core which is attached to the tubular sleeve at one end thereof by means of a thin shearable connection, and a threaded, bolt-receiving nut which is encased in the retaining core. The retaining core is dimensioned so that it can telescope within the tubular sleeve when the thin connection is sheared thereby expanding the tubular sleeve radially against the panel in which the sleeve is mounted and prestressing the panel. The retaining core and nut are dimensioned so that the nut floats within the retaining core.

Background of invention

Often it is necessary to attach articles such as structural parts, electrical equipment, meters, accessories and the like to large panel sections. This is accomplished by affixing fasteners to the panels for receiving bolts or other mating members from the articles being attached. These fasteners must sometimes be mounted on a panel which is accessible from only one side. For example, it may be necessary to mount electrical equipment or other accessories on one side of the skin panel of an aircraft where the oposite side of the panel is inaccessible. Additionally it is sometimes more convenient to mount fasteners on large panels from one side of the panel even though the other side may be accessible. Most conventional fasteners, however, such as anchor nuts and the like are affixed to the panels by a riveting operation which requires two operators and access to both sides of the panel.

Normally mounting the fasteners on such panels requires drilling a hole in the panel and fitting the fastener into the hole. If the panel undergoes any stresses, the drilled hole acts as a stress concentrator and crack initiator which may reduce the resistance of the panel to fatigue failure.

A problem common with prior art fasteners is that even if they can be mounted on a single panel from one side in a "blind" fashion, the spacing between fasteners must be exact to receive the mounting elements of the mating structural member being attached to the panel. Thus, if the fasteners are off slightly, a new fastener must be inserted in the panel or the panel must be redrilled in another area for receiving the fasteners and the previous bored hole sealed I if posisble or allowed to remain in the panel.

The drilled hole in the panel forms a discontinuity in the panel skin which acts as a stress concentrator the severity of which is dependent on the radius of curvature of the hole. Additionally, if the edges of the hole are not exactly smooth, they may provide a severe notch effect which highly increases the stress concentrations in these regions. Thus when a tensile force is applied to the panel, for example, as when the fastener is a riveted anchor nut and a heavy structural part is attached to it, these notches provide regions of high stress which may act as crack initiators for fatigue failure.

Additionally, the prior art panel fasteners are insufficient to meet the requirements of many applications since they provide only one thread size for receiving only a specific type of threaded fastener when they are mounted on the panel. For example, some fasteners comprise basically an internally threaded core member and an external sleeve which surrounds the core member. The thread size of the core member is not adjustable and once the core member is in place it cannot be removed and replaced by a different core in the sleeve. Consequently, if the threads are stripped or if a different size threaded fastener is desired, an entirely new fastener must be placed in the panel. This requires driving the old fastener out of the hole which was drilled in the panel and inserting a new fastener therein. This may cause enlargement of the hole so that a new fastener does not readily fit therein. Additionally such removal of the fastener may damage the sides of the drilled hole and create new notches for concentration of stresses.

Thus to be effective in satisfying the present needs of industry with respect to fasteners insertable in panels which are either too large to be accessible from both sides at the same time by one person or are accessible only from one side, a fastener mechanism should be able to provide a floating seat for receiving the mating members from structural parts. For example, if the fastener includes a threaded nut, the nut should be able to float within its mounting assembly in the panel. The fastener mechanism should also include means therein for counterbalancing internal stresses in the panel to compensate for the notch effect of the edge of the hole which receives the fastener. This is esesntial so that the stress concentration around the edge of the hole will not be undesirably high. Preferably, the fastener mechanism should be capable of inducing internal compressive stresses in the panel which compensate in part for the tensile stresses applied to the panel and thereby reduce the overall stress which is concenrtated at the fastener mounting hole. To be most effective the fastener should also be adaptable to receive various size mating structural mounting members.

Summary of the invention

This invention is directed to a fastener device for mounting structural parts on a panel. The fastener device is designed for installation in drilled holes in the panel and can be installed even though the panel is accessible from only one side. The fastener has a tubular sleeve which engages the periphery of the hole in the panel. A retainer member is attached to the tubular sleeve so that it can be drawn into the sleeve for expanding the sleeve against the edge of the hole in the panel. The retainer encases a floating mounting socket therein for mounting mating structural members on the panel. For example the floating mounting socket may be a floating nut which is internally threaded. Means are on the internal surface of the retaining member and on the external surface of the floating mounting socket to restrain rotational movement of the socket within the retainer member and to limit the axial position of the socket.

More specifically the device comprises a hollow cylindrical sleeve which is adapted to fit through the drilled hole in a panel. A retainer core is mounted at the rear edge of the cylindrical sleeve by a thin metal section which is shearable to permit the retainer core to be drawn into the sleeve and expand the sleeve against the edge of the hole in the panel. The retainer member has a flange at its end nearest the sleeve. This flange provides a foundation for limiting forward axial movement of the mounting socket which is fitted into the retaining member. The mounting socket may be a threaded nut for receiving bolts to mount the structural parts in place. The retainer member is also provided with an internal groove which receives a retaining or locking ring for limiting rearward axial movement of the nut and for maintaining the nut within the retainer member.

The preferred mounting socket is a nut which has a camming surface substantially conical in configuration and when inserted into the retainer member forces the locking ring outwardly to permit the nut to be snapped into position. The upper edge of the nut has a radially extending circumferential groove into which the ring snaps when the nut has been positioned in the retainer member.

Both the external surface of the nut and the internal surface of the retainer member are provided with splines which interconnect to prevent the threaded nut from being rotated within the retainer member so that when a fastening device is turned into place in the retainer the nut will not turn. There is enough clearance between the splines of the nut and the retainer member, however, to permit floating movement of the nut within the retainer member.

One feature of the fastener device of this invention is that it can be mounted blind from one side of a panel without access to the other side of the panel.

Another feature of the fastener device of this invention is that it provides a floating socket for receiving mating mounting members from the structural parts to be affixed to the panel.

Yet another feature of the device of this invention is that it pre-stresses the portion of the panel surrounding the aperture through which the fastener is mounted thereby reducing the susceptibility of the panel to fatigue failure.

Still another feature of the fastener device of this invention is that the floating mounting sockets can be replaced without removing the entire fastener device from the panel or damaging the panel as long as access can be had to the blind side of the panel to make such replacements.

Still another feature of the fastener device of this invention is that it can be mounted on a panel by only one operator rather than the two operators normally required for installation of such devices.

These and other features of the device of this invention will become more readily apparent from a consideration of the following description of the preferred embodiment when taken with the appended claims and the attached drawings.

Description of preferred embodiment

Figure 1:
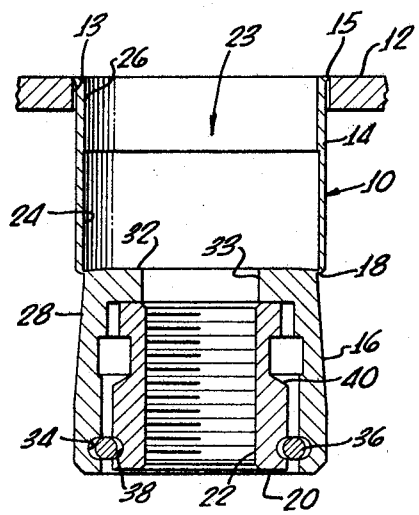
FIGURE 1 is an axial sectional view through the fastener mechanism of this invention in its expanded position loosely inserted in a panel member.

FIGURE 1 shows the fastener 10 of this invention loosely fitted on a panel 12 through a drilled circular hole 13. The fastener is divided basically into three cylindrical elements: an upper tubular sleeve 14 which has an outwardly flaring external lip 15 of greater diameter than the sleeve or the drilled hole 13; a lower retaining core or retainer member 16 which is connected to the sleeve 14 by means of a thin shearable annular conection 18; and a floating mounting socket such as a bolt-receiving floating nut 20 which is provided with a threaded internal bore 22. The lip 15 of the sleeve 14 engages the front skin or side of the panel 12: i.e. the side of the panel on which the fastener will be used as an attachment base. The main portion of the fastener 10 extends through the hole 13 to the back or not easily accessible side of the panel.

Sleeve 14 has a stepped or tapered cylindrical bore 23. The diameter of the lower or back portion 24 is slightly larger than the diameter of the front portion 26. The retainer member 16 is provided with a cone-like, axially tapered forward portion 28 to permit the retainer member to be telescoped into the lower portion 24 of the sleeve 14 once the annular connecting portion 18 has been sheared. The external diameter of the forwardmost edge of the tapered portion 28 is slightly less than the internal diameter of the front portion 26 of the sleeve 14, but the diameter of the external surface 28 quickly flares outwardly by a sufficient extent so that this portion of the retainer 16 has a larger diameter than the internal diameter of front section 26 of the sleeve 14 and a radially expanding force must be exerted against the sleeve 14 to telescope retaining core 16 therein.

The internal bore of the retainer member 16 is provided with a radially, inwardly extending annular flange 32 at its forwardmost end which defines a forward axial movement limit for the floating nut 20. The inner edge 33 of the annular flange 32 also defines a circular passage for passing threaded attachment members which are mounted in the nut 20. The internal bore of the retainer 16 is also provided with an annular groove 34 at an axially spaced location near its oppioste end.

Figure 2:
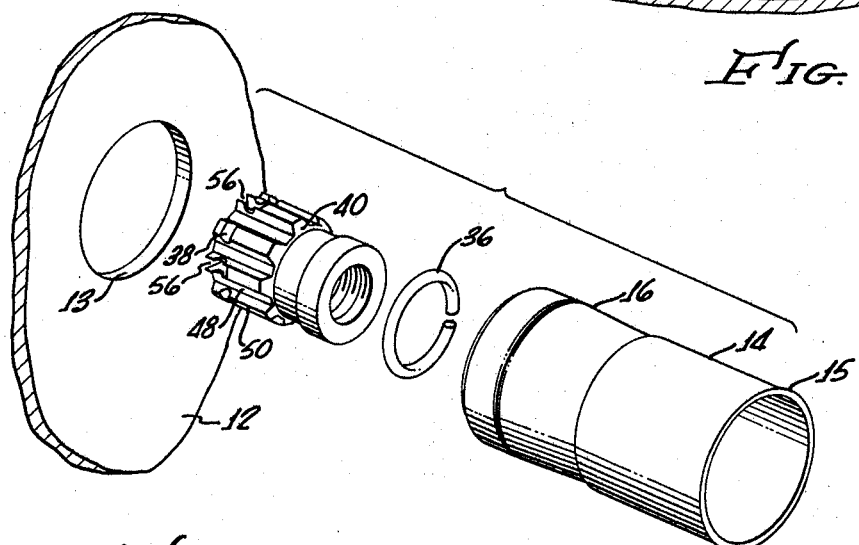
FIGURE 2 is an exploded view in perspective of the fastener mechanism of FIG. 1.

An annular locking device such as the retaining ring 36 is adapted to fit loosely in the groove 34 and to move between the groove 34 and an aligned groove 38 in the floating nut 20. The retaining ring 36 is a split ring which is radially expansible, as best shown in FIGURE 2. The ring is perferably a wire spring constructed from a hardened flexible metal such as heat treated steel.

With continued reference to FIGURE 1 and to FIGURE 2, an annular, axially tapered caming surface 40 is also provided near the forward portion of the external surface of the floating fastener 20 for camming the retaining ring 36 outwardly into the groove 34 when the fastener 20 is inserted into the retainer member 16.

As shown in FIGURE 1, the clearance between the outer surface of floating nut 20 and the inner surfaces of the retaining core 16 is sufficient to permit fastener 20 to "float" within the retaining core 16 by a relatively large amount. The retaining ring 36 loosely fits within the grooves 34 and 38 to permit this floating movement without permitting the nut to be axially removed from the back of the retaining core 16. Thus axial movement of the nut 20 within the core 16 is limited by means of the flange 32 on the retaining core 16 and the lower retaining ring 36. Radial movement of the nut 20 within the retaining core 36 is limited merely by the external dimensions of the nut 20 and the internal dimensions of the core retainer 36, so that the nut 20 floats within the retainer 16 by substantially any desired amount within the limits defined by the size of the nut 20, and the retaining core 16. The tolerance provided for the mating structural element is also limited by the size of the circular passage defined by the edge 33 of the flange 32.

Figure 4:
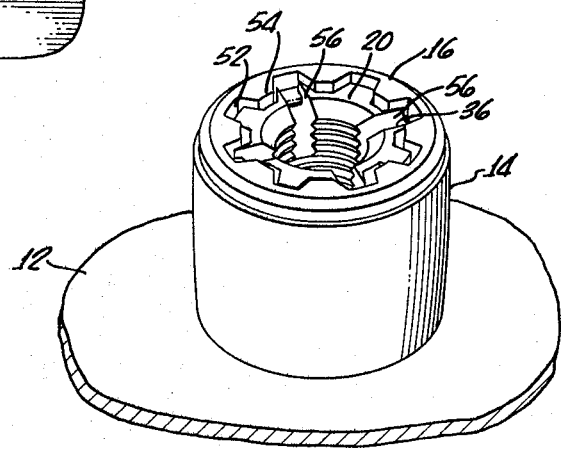
FIGURE 4 is a perspective view from the back side of the panel showing the device of this invention in its telescoped position securely mounted in the panel.

As best shown in FIGURES 2 and 4, the external surface of the threaded nut 20 also has a plurality of circumferentially-spaced, axially-extending channels 48 and splines 50 which carry the groove 38 therein. Similarly, the internal suface of the retaining core 16 is provided with axially-extending channels 52 and splines 54 which are circumferentially spaced to mate with the splines 50 as shown in FIGURE 4. The intermeshing of the splines 54 and 50 restrains rotational movement of the nut 20 within the retainer 16.

The clearance between the axially extending cooperating, intermeshing radial splines 50 and 54 which are circumferentially spaced about the threaded nut and the retainer provides a floating seat for the nut. Since the splines 50 on the nut are symmetrically spaced from the splines 54 and recesses 52 on the retaining core 16, the nut is capable of full radial floating in all directions.

Figure 3:
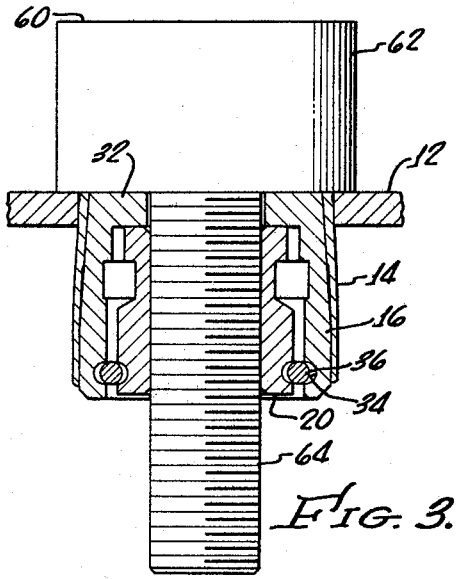
FIGURE 3 is a sectional view of the fastener of this invention in its telescoped fixed position and tool for affixing it on a panel.

As shown in FIGURES 2 and 3, the back portion of the nut 20 is provided with four circumferentially-spaced, axially-extending, slots 56 which are spaced about 90° apart around the circumference of the fastener 20. The slots 56 extend axially through four of the splines 50 so that the circumferential groove 38 passes through the slots.

In assembly of the device, the retaining ring 36 is first snapped into position in the groove 34 of the splines of the retaining core 16 as best shown in FIGURE 1. The floating nut 20 is then press-fitted into the core 16 so that camming surfaces 40 expand the retaining ring 36 radially outwardly to permit bypass of the nut 20. When the circumferential groove 38 on the nut 20 is drawn into alignment with the groove 34, the ring 36 snaps into the groove 38 as shown in FIGURE 1, to maintain the threaded nut 20 axially aligned within the retaining core 16.

The fastener 10 is mounted on the panel 12 by first loosely positioning the sleeve 14 within a drilled hole in the panel 12 as shown in FIGURE 1 with the lip 15 engaging the edge of the hole and then by inserting a manual or automatic threaded puller such as the tool 60 shown in FIGURE 3. Basically the tool shown in FIGURE 3 is of bolt-like construction and comprises a large flat head 62 and a threaded mandrel 64 which is retractable. The tool 60 is drawn tight, whereby the mandrel 64 is pulled back and the force reacted by the flat head 62, shearing the thin connection 18 between the sleeve 14 and the retaining core 16. The retaining core is then pulled forwardly into the sleeeve 14 by further tightening the tool. The conical portion of the retainer core 28 fits closely within the sleeve 14 and as the core is pulled forwardly into the sleeve it expands the sleeve radially outwardly against the edge of the hole 13 in the panel 12. This pre-stresses the panel creating an internal compressive stress distribution within the panel surrounding the hole 13. These stresses are directed inwardly toward the hole and counteract tensile forces which may be applied to the panel. The effect of the hole as a discontinuity or stress concentrator in the panel is thus reduced.

Figure 5:
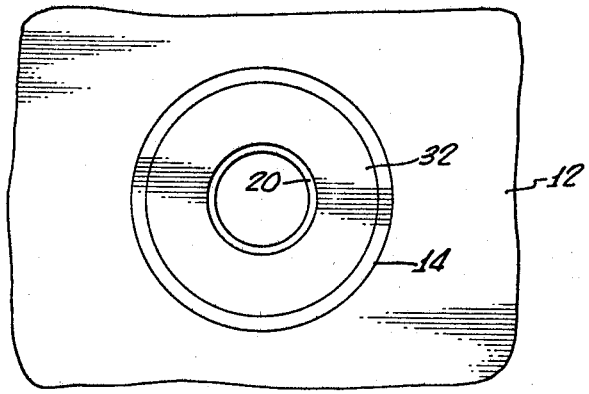
FIGURE 5 is a front elevation of the panel with the fastener device of this invention securely mounted therein.

The retaining core 16 is drawn substantially flush with the front surface of the panel 12 by tightening the tool 60 tightly down against the panel 12. In this manner both the front edge of the sleeve 14 and of the core 16 are substantially flush with the front surface of the panel 12 to provide a smooth appearing surface. As shown in FIGURES 4 and 5, when the fastener is drawn up tight it has a neat, unobtrusive appearance on the panel. The only portions of the fastener visible from the front of the panel (see FIG. 5) are the front edges of the sleeve 14, the flange 32 on the retaining core 16 and a portion of the front surface of the floating nut 20.

The unitary construction of the sleeve 14 and the core 16 permits easy installation from one side of a panel merely by inserting the retaining core 16 with the retaining ring 36 and the nut 20 already mounted therein through a drilled hole in the panel and then tightening them down by means such as the tool 60. Any means for tightening down the fastener which is sufficient to shear the thin connection 18 between the sleeve and the core and to telescope the core 16 forwardly into the sleeve 14 can be used. For example, the core can be drawn forwardly, as discussed, by threading the mandrel 64 of the tool 60 tightly against the nut 20 in panel 12 as shown in FIGURE 3 and then pulling forward to break the junction at 18 and pull the retaining core 16 forwardly into the sleeve 14 so that the fastener is flush with the panel and the sleeve is forced outwardly against the panel locking the fastener in place.

The fastener can easily be installed in a panel by one operator with either a manual or automatic hand tool even though the panel is accessible from only one side. This is a marked advantage over present methods of installation which normally require two operators to perform the riveting operation required for attaching fasteners such as anchor nuts.

As shown in FIGURE 4, the slots 56 on the floating nut are accessible from the back side of the panel 12. The retaining ring extends radially into the slots 56 on the splines 50 of the floating nut 20 in its contracted position and can be expanded radially out of these slots as will be discussed.

Figure 6:
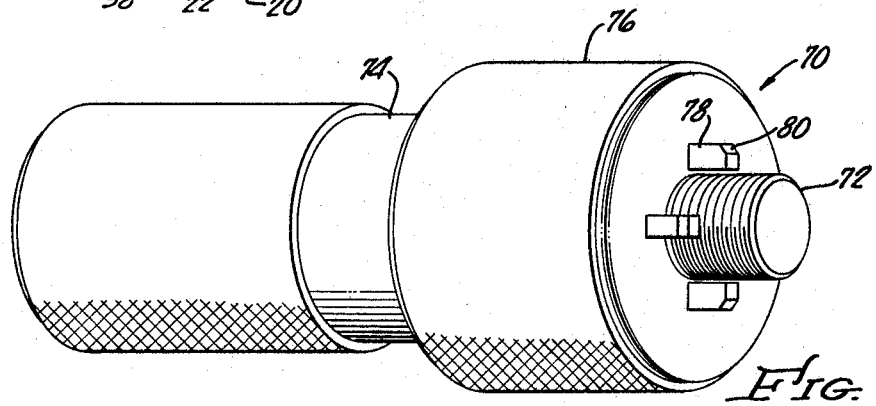
FIGURE 6 is a perspective view of a ring expanding tool for removing the floating nut from its retainer.

The floating nut 20 is removable from the fastener 10 even after it is mounted in the panel by means of a special tool 70 shown in FIGURE 6. This tool comprises an externally threaded shaft portion 72 which is non-rotatably connected to a knurled handle 74 and rotatably connected to a knurled, internally threaded, bored ring expander 76. The expander 76 is threadedly mounted on the shaft 72 for movement thereon. Four circumferentially-spaced, axially-extending prongs 78 are arranged on the end of the expander 76 to fit in the slots 56 of the threaded nut 20. Each of the prongs 78 has a radially, outwardly inclined camming surface 80.

Figure 7:
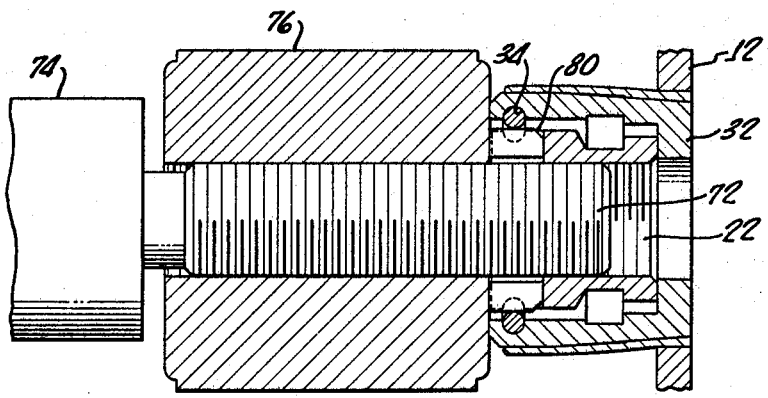
FIGURE 7 is a sectional view through the telescoped fastener of this invention and the ring expanding tool of FIGURE 6 showing how the nut is removed.

As shown in FIGURE 7, to remove the nut 20 and replace it with another, the prongs 78 are inserted into the slots 76 and camming surfaces 80 expand the ring 36 radially into the groove 34 on the retaining core 16. The threaded shaft 72 is then advanced through the ring expander 76 into the threaded bore 22 of the nut 20 with the prongs 78 fixed in the slots 56. The threaded shaft can be advanced into the nut without turning the nut 20 since the splines 50 and 54 interlock to restrain rotational movement of the nut within the retaining core 16. The threaded shaft 72 is thus attached to the floating nut 20. The prongs 78 force the ring 36 radially outwardly by a sufficient distance to permit withdrawal of the nut 20 from the retaining core 16. Another nut of the same or different thread size may then be inserted by forcing it passed the ring 36 by means of the camming surfaces 40 on the exterior of the nut.

The fasteners of this invention are easily able to provide a tolerance of about .02 inch radius. Larger desired tolerances can be provided by proper selection of the dimensions of the floating nut 20 and the retaining core 16.

The sleeve 14, retaining core 16 and the nut 20 may be machined or otherwise formed from metals such as low carbon steel, stainless steel, aluminum and the like. The sleeve and retaining core may be integrally connected by the thin metal connection 18 or they may be welded or otherwise attached by a shearable joint. The retaining ring 36 may be an anodized high strength carbon steel or stainless steel. Any suitably expandable materials, for example, aluminum or brass may be used, however.

With the device of this invention it is possible to change the thread size of the floating nut or to replace the nut if the threads or stripped during use of the fastener without removing the sleeve and retainer from the panel. In this fashion the stress configuration on the panel surface is not changed and the hole which is drilled through the panel is not altered or disfigured by changing the nut.

The invention may be embodied in other specific forms without departing from the spirit or essential characteristics thereof. The present embodiment is therefore to be considered in all respects as illustrative.

What is claimed and desired to be secured by Letters Patent is:

1. A floating, blind fastener device insertable into an aperture in a panel for mounting members on the panel, said fastener comprising:
   a sleeve for engaging the periphery of said aperture;
   means for radially expanding said sleeve against said panel to impart compressive stresses to said panel;
   a floating mounting socket within said expanding means for mounting said members on said panel; and
   means within said expanding means for limiting rotational and axial movement of said mounting socket.

2. A fastener device as defined in claim 1 wherein said expanding means comprises a cylindrical retaining core for said floating mounting socket, said retaining core being attached to said sleeve by a thin connecting portion which is shearable to permit said core to be drawn into said sleeve and expand said sleeve against said panel thereby enabling said fastener to be mounted to a panel from one side of the panel.

3. A fastener device as defined in claim 2 wherein said floating mounting socket comprises an internally threaded ntu for receiving a mating threaded fastener.

4. A fastener device as defined in claim 3 wherein said nut and said retaining core are dimensioned to permit radial floating of said nut within said core.

5. A fastener device as defined in claim 4 wherein said means for limiting axial movement of said nut comprises an annular, radially expansible ring and wherein said core and said nut are provided with opposing circumferentially extending grooves for receiving said ring therein, said ring being expansible into the groove on said core for permitting removal of said nut.

6. A fastener device as defined in claim 5 wherein said nut includes an external axially tapered camming surface for radially expanding said ring when said nut is inserted into said core.

7. A fastener device as defined in claim 5 wherein said nut is provided with axially extending slots which intersect with said groove in said nut for receiving a tool for expanding said ring out of said groove during removal of said nut from said core.

8. A fastener device as defined in claim 1 wherein said expanding means comprises a cylindrical socket retaining core and wherein said rotational movement limiting means comprise axially extending, splines on said core and said mounting socket, said splines being circumferentially spaced about said core and said mounting socket so as to interlock there being sufficient clearance between said splines so that said mounting socket floats within said retaining core.

9. A floating fastener member for mounting on a panel to provide a threaded seat in the panel comprising:
   a cylindrical nut member having an internally threaded bore, the external surface of said nut member including a camming surface, a circumferentially-extending groove and an axially extending spline;
   a nut retaining core, said retailing core including: a cylindrical bore therein for receiving said nut member, a locking ring retaining groove in the rear portion of said bore for mounting a locking ring therein in axial alignment with the circumferentially extending groove on said nut member, an axial position limiting surface in the front portion of said bore for limiting movement of said nut member axially within said retaining member, an axially extending spline-receiving channel for receiving the spline from said nut member to limit rotational movement of said nut member within said retaining core;
   a cylindrical sleeve connected to the front end of said retaining core, said sleeve being of slightly less internal diameter than the rear end of said retaining core so that said sleeve must expand radially to admit said core therein, said sleeve being connected to said retaining core by a shearable annular junction; and
   an annular locking member mounted in said internal groove on said core and said external groove on said nut member, said locking member being radially expansible and said internal groove on said retainer member being sufficiently large to permit outward radial expansion of said locking member by a distance sufficient to remove said nut member.

References Cited

UNITED STATES PATENTS

| | | | |
|---|---|---|---|
| 2,304,107 | 12/1942 | Leisure | 151—41.76 |
| 2,553,236 | 5/1951 | Bratfisch | 85—70 |
| 3,079,188 | 2/1963 | Oswold | 85—8.8 |
| 3,128,813 | 4/1964 | Davis et al. | 85—70 |
| 3,241,591 | 3/1966 | Rosan et al. | 151—41.7 |
| 3,411,398 | 11/1968 | Blakeley et al. | 85—72 |

FOREIGN PATENTS

| | | |
|---|---|---|
| 1,093,714 | 12/1967 | Great Britain. |

MARION PARSON, Jr., Primary Examiner

U.S. Cl. X.R.

85—8.8, 74; 151—41.7